H. G. THOMPSON.
HEADLIGHT.
APPLICATION FILED OCT. 22, 1917.
1,284,955. Patented Nov. 12, 1918.
2 SHEETS—SHEET 1.
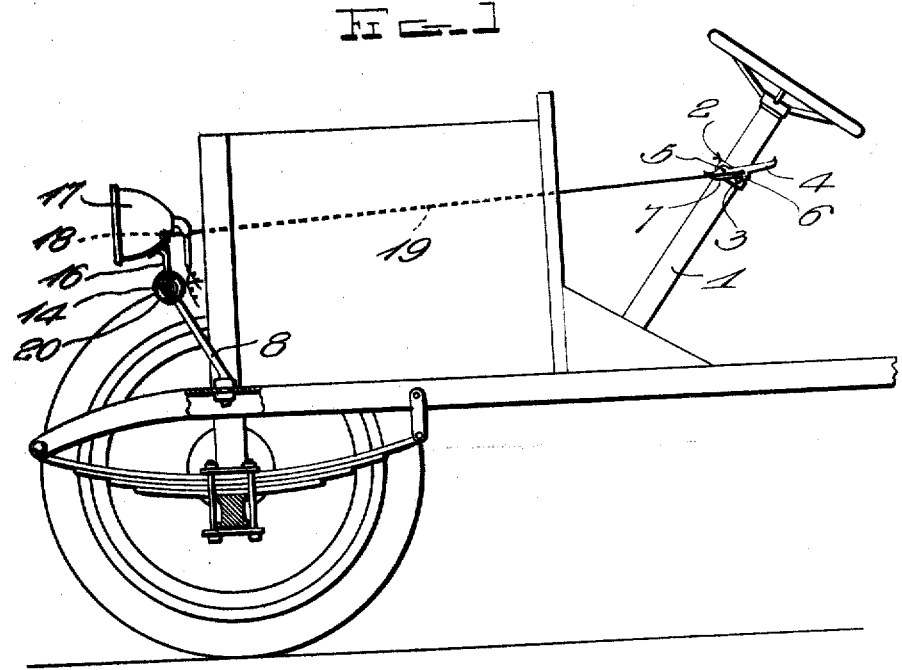
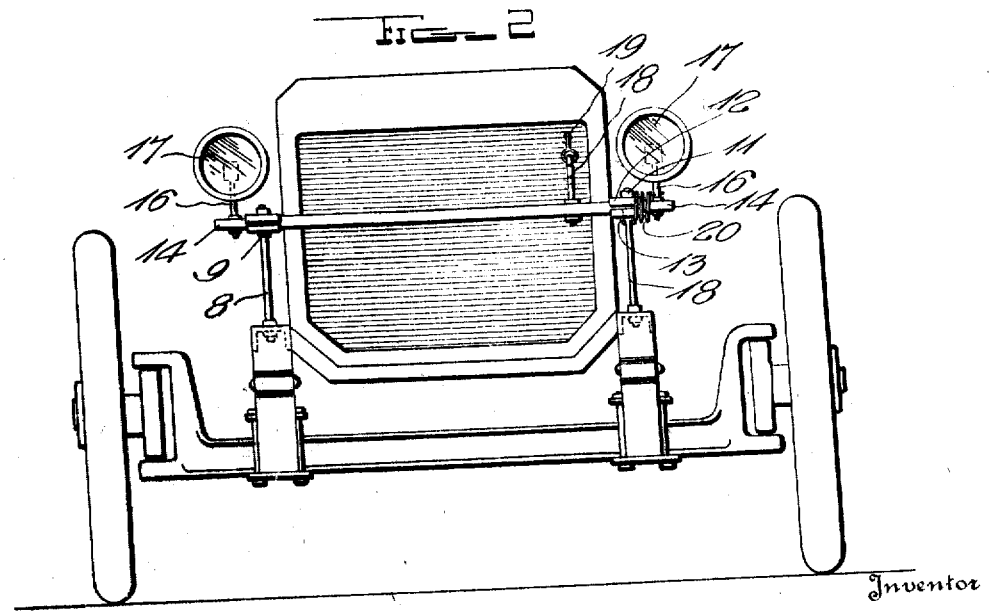
Inventor
Herschel G. Thompson
By Deane & Custer
his Attorneys

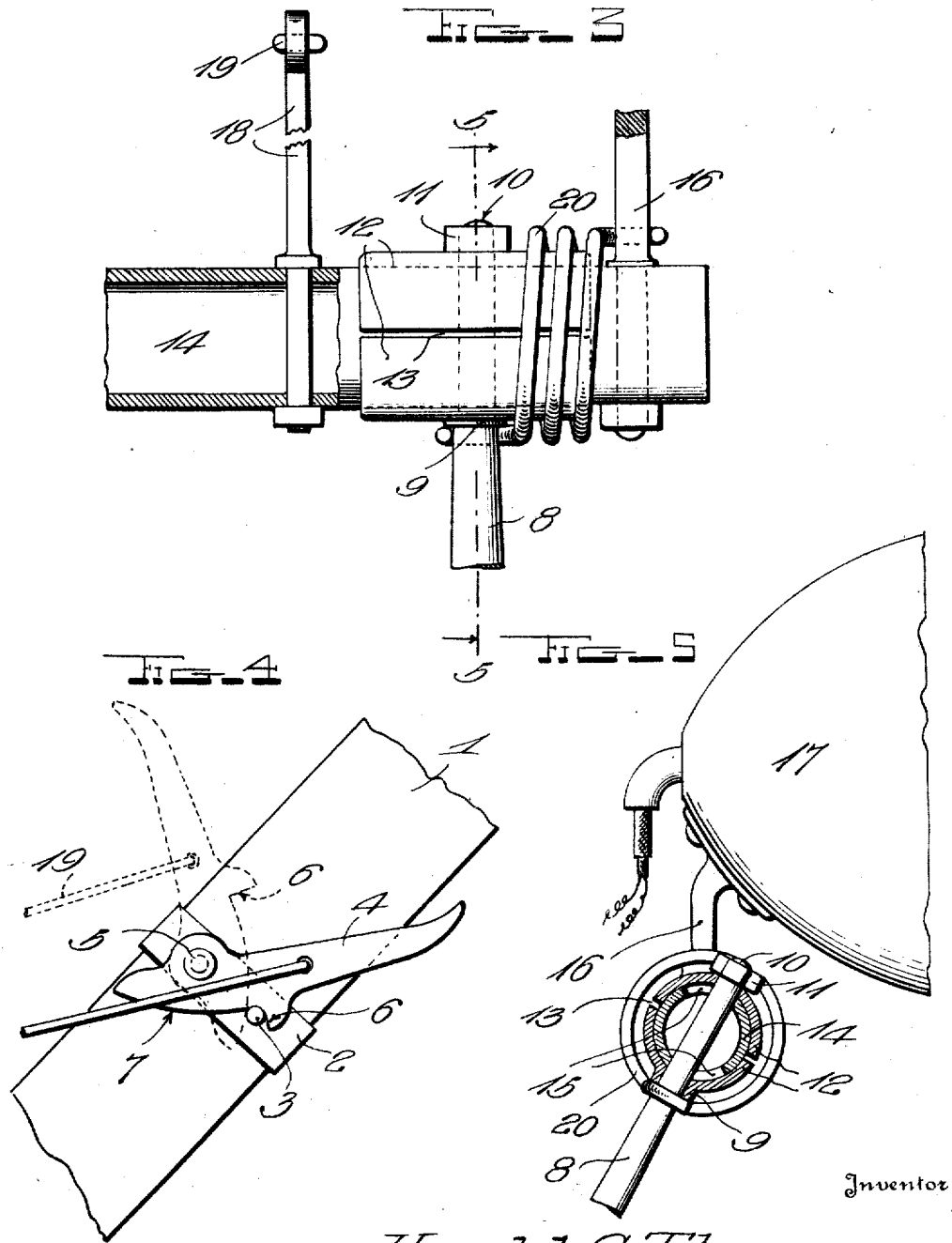

UNITED STATES PATENT OFFICE.

HERSCHEL G. THOMPSON, OF STAR CITY, INDIANA, ASSIGNOR OF ONE-HALF TO JACOB FARENBAUGH, OF STAR CITY, INDIANA.

HEADLIGHT.

1,284,955.

Specification of Letters Patent.   Patented Nov. 12, 1918.

Application filed October 22, 1917.  Serial No. 197,908.

*To all whom it may concern:*

Be it known that I, HERSCHEL G. THOMPSON, a citizen of the United States, residing at Star City, in the county of Pulaski and State of Indiana, have invented certain new and useful Improvements in Headlights, of which the following is a specification.

My present invention has to do with the support, manipulation, positioning and adjustable fixing of the headlights of automobiles and the like.

The general object of the invention is the provision of means for detachably, though reliably, securing a light or lights in normal position to illuminate the roadway ahead, as when an automobile is proceeding along a highway, and for enabling the automobile driver to quickly and easily release the light or lights and to bring about the downward deflection of the same so as to prevent the light or lights from bewildering the driver of an automobile approaching in the opposite direction.

The invention also contemplates the employment of torsional spring means for assisting in the quick downward movement of the light or lights and yieldingly holding the same in the downwardly-directed position as well as for cushioning the light or lights and preventing the transmission of shock and jar thereto; and it further contemplates the utilization, preferably though not necessarily on the steering post of the automobile, of simple and easily operated means for securely locking the light or lights in the normal raised position.

With the foregoing in mind the invention will be fully understood from the following description and claims when the same are read in connection with the drawings, accompanying and forming part of this specification, in which:

Figure 1 is a detail side elevation of a portion of an automobile equipped with my novel lamp support.

Fig. 2 is a front elevation of the same.

Fig. 3 is an enlarged detail illustrating the application of one of the torsional springs.

Fig. 4 is an enlarged detail showing the handle lever of the steering post and the parts complementary to said lever.

Fig. 5 is an enlarged detail section showing the manner of mounting the transverse rock shaft on one of the supporting posts.

Similar numerals of reference designate corresponding parts in all of the views of the drawings.

In the present and preferred embodiment of my invention, the steering post 1 of the automobile is made use of as a support for a collar 2, having a stop pin 3, and on the said collar a hand lever 4 is fulcrumed at 5. The inner enlarged portion of the said lever is provided at opposite sides of the fulcrum point, with stop-engaging portions 6 and 7, designed to alternately bring up against the stop pin 3, for purposes hereinafter set forth.

Suitably fixed to portions of the chassis of the automobile, at opposite sides of the forward end thereof are posts 8, shouldered at 9 and threaded at their upper ends 10 and equipped with nuts 11, and mounted on and receiving the said posts are collars 12. These collars are split, as indicated by 13 and are interposed and secured between the shoulders 9 and the nuts 11, and hence it will be manifest that when occasion demands the collars may be tightened to take up wear or for any other purpose.

Journaled in the collars 12 and extending between as well as outwardly beyond the same is a rock shaft 14, having slots 15 that receive the posts 8 and permit of rocking movements of the shaft on and relative to the posts, and carried by the outwardly extended portions of the said rock shaft are arms 16 on which the lights 17 are mounted; the said lights per se being of any type or construction compatible with the purpose of my invention.

Fixed to the rock shaft 14, preferably between the collars 12 and adjacent to one of the same is a crank 18, and interposed between the said crank and the hand lever 4 is a connecting rod 19. This rod may extend through the radiator of the machine, though I prefer to carry it exterior of and alongside the machine hood to effect the connection stated.

Surrounding the extended portion of the rock shaft 14 are torsional springs 20 the terminals of which are shaped to engage the posts 8 and the light-carrying arms 16, respectively, as shown.

The operation of my novel light supporting and manipulating means is as follows:

When the hand lever 4 is pulled rearwardly and downwardly so that its stop-engaging portion 6 brings up against the stop pin 3, the connection of the rod 19 to the lever 4 will rest beyond the dead center and hence any downward and forward pull on the rod 19 will only tend to maintain the portion 6 more securely in engagement with the stop pin 3. In this way the lights are securely though detachably fixed in the normal position to illuminate the roadway in front of the moving automobile.

To bring about the downward deflection of the lights, the driver has but to move the lever 4 upwardly and forwardly until the lever portion 6 brings up against the stop pin 3 since when this is done the shaft 14 is rocked forwardly and downwardly through the rod 19 and crank 8, and the light arms 16 and the lights 17 thereon are swung forwardly and downwardly, the said movement being assisted by the torsional springs 20 which at the completion of the movement serve to yieldingly hold the lights in the downwardly deflected position as well as to cushion the lights and protect the same against shock and jar.

It will also be noted here that when the lights are raised to and locked in the normal position referred to, the torsional springs 20 are put under tension so that said springs in addition to efficiently cushioning the lights, are in readiness to promptly assist the downward movement of the lights when the approach of another automobile makes such deflection of the lights necessary or desirable.

It will be manifest from the foregoing that my novel mechanism is simple, durable and efficient, and is susceptible of being readily installed on automobiles such as at present in use; also, that the mechanism is compact and generally neat in appearance and therefore when properly embellished is calculated to enhance rather than detract from the finished appearance of an automobile.

Having described my invention, what I claim and desire to secure by Letters Patent, is:—

1. In means for the purpose described, the combination of the chassis and steering post of an automobile, posts fixed to the chassis at opposite sides of the forward end thereof and having shoulders and threaded extremities, nuts on said extremities, split collars mounted on said posts and interposed between said shoulders and nuts, a rock shaft journaled in said collars and extending between and outwardly beyond the collars and having slots receiving the said posts, arms on the extended portions of the rock shaft and carrying lights, a crank on the rock shaft, torsional springs surrounding the extended portions of the rock shaft and having terminals engaging the posts and the light arms, respectively, and means connected to the said crank and constructed and arranged to detachably secure the same in one position.

2. In means for the purpose described, the combination of the chassis and steering post of an automobile, a stop on the steering post, a hand lever fulcrumed on the post and having portions at opposite sides of the fulcrum point, adapted to alternately bring up against the stop, a transverse rock shaft connected with and supported by the chassis, arms fixed to said rock shaft and carrying lights, a crank on the rock shaft, torsional springs surrounding the rock shaft and engaging the supporting means thereof and also engaging the arms that carry the lights, and a rod extending between and connecting the hand lever on the steering post and the crank on the rock shaft, one of the lever portions being arranged to bring up against the stop pin when the springs are under tension, and the connection of the rod to the lever being arranged to rest at that time beyond the dead-center.

3. In means for the purpose described, the combination of the chassis and steering post of an automobile, a stop on the post, a hand lever fulcrumed on the post and having a portion adapted to bring up against said stop, a rock shaft connected with and supported by the chassis and having a crank, a rod connection between said crank and the hand lever, an arm carried by and movable with said shaft, a torsional spring engaging the shaft support and the arm, and a light on said arm; the lever portion being arranged to bring up against the stop when the spring is under tension, and the connection of the rod to the lever being arranged to rest at that time beyond the dead-center.

4. In means for the purpose described, the combination of the chassis and steering post of an automobile, vertically-swinging light-carrying means supported on the chassis, spring means arranged to cushion said light-carrying means and to yieldingly hold the same in a downwardly-deflected position, a stop on the steering post, a hand lever fulcrumed on said post and having a stop-engaging portion, and a rod and crank connection between said hand lever and the light-carrying means; the lever portion being arranged to bring up against the stop when the spring means is under tension, and the connection of the rod to the lever being arranged to rest at that time beyond the dead-center.

5. In means for the purpose described, the combination of an automobile, vertically-swinging light-carrying means supported on the same, spring means constructed and arranged to cushion said light-carrying means and to yieldingly hold the same in a downwardly deflected position, a stop supported on the automobile, a hand lever fulcranked on the automobile adjacent to said stop and having a portion adapted to bring up against said stop, and a rod and crank connection between said hand lever and the light-carrying means, the lever portion being arranged to bring up against the stop when the spring means is under tension, and the connection of the rod to the lever being arranged to rest at that time beyond the dead center.

6. In means for the purpose described, the combination of an automobile, posts fixed thereon and having shoulders and threaded ends, nuts on said ends, split collars mounted on the posts between the nuts and the shoulders, a rock shaft journaled in the collars and having slots receiving the posts, and lights carried by said shaft.

7. In means for the purpose described, the combination of an automobile, posts fixed thereon and having shoulders and threaded ends, nuts on said ends, split collars mounted on the posts between the nuts and the shoulders, a rock shaft journaled in the collars and having slots receiving the posts, lights carried by said shaft, and torsional springs surrounding the split collars and engaging the posts and the light-carrying means.

In testimony whereof I affix my signature in presence of two witnesses.

HERSCHEL G. THOMPSON.

Witnesses:
  EDITH MATT,
  FLORENCE HOLLAND.